United States Patent
Ito et al.

(10) Patent No.: US 6,636,392 B2
(45) Date of Patent: Oct. 21, 2003

(54) THIN-FILM MAGNETIC HEAD WITH MAGNETORESISTIVE EFFECT ELEMENT

(75) Inventors: Noriyuki Ito, Tokyo (JP); Koichi Terunuma, Tokyo (JP); Fumihiro Hiromatsu, Tokyo (JP)

(73) Assignee: TDK Corporation, Tokyo (JP)

(*) Notice: Subject to any disclaimer, the term of this patent is extended or adjusted under 35 U.S.C. 154(b) by 132 days.

(21) Appl. No.: 09/899,162

(22) Filed: Jul. 6, 2001

(65) Prior Publication Data

US 2002/0024779 A1 Feb. 28, 2002

(30) Foreign Application Priority Data

Jul. 11, 2000 (JP) .................................. 2000-209910

(51) Int. Cl.$^7$ ................................................ G11B 5/39
(52) U.S. Cl. ............................................... 360/324.1
(58) Field of Search ..................... 360/324.1, 324.11, 360/324.12, 325, 326, 327

(56) References Cited

U.S. PATENT DOCUMENTS

| | | | | |
|---|---|---|---|---|
| 5,699,213 A | * | 12/1997 | Ohyama et al. | 360/327.32 |
| 5,936,810 A | * | 8/1999 | Nakamoto et al. | 360/324.1 |
| 6,094,325 A | * | 7/2000 | Tagawa et al. | 360/324.12 |
| 6,114,850 A | * | 9/2000 | Hayashi | 360/324.1 |
| 6,141,190 A | * | 10/2000 | Nakamoto et al. | 360/324 |
| 6,185,078 B1 | * | 2/2001 | Lin et al. | 360/324.1 |
| 6,219,207 B1 | * | 4/2001 | Pinarbasi | 360/324.1 |

FOREIGN PATENT DOCUMENTS

| | | | | |
|---|---|---|---|---|
| JP | 07-057223 | * | 3/1995 | G11B/5/39 |
| JP | 07-254114 | * | 10/1995 | G11B/5/39 |
| JP | 09-237408 | * | 9/1997 | G11B/5/39 |
| JP | 10-302228 | | 11/1998 | |
| JP | 11-120520 | | 4/1999 | |
| JP | 2000-222710 | * | 8/2000 | G11B/5/39 |
| JP | 2001-084527 | * | 3/2001 | G11B/5/39 |

* cited by examiner

Primary Examiner—George J. Letscher
Assistant Examiner—Christopher R Beacham
(74) Attorney, Agent, or Firm—Burns, Doane, Swecker & Mathis. L.L.P.

(57) ABSTRACT

A thin-film magnetic head with an MR element, includes an MR film, under films each having a multilayer structure with a first under layer and a second under layer laminated on the first under layer, and magnetic domain control films joined to side end faces of the MR film through the under films.

8 Claims, 3 Drawing Sheets

THIN-FILM MAGNETIC HEAD WITH MAGNETORESISTIVE EFFECT ELEMENT

FIELD OF THE INVENTION

The present invention relates to a thin-film magnetic head provided with a magnetoresistive effect (MR) element such as an anisotropic magnetoresistive effect (AMR) element, with a giant magnetoresistive effect (GMR) element such as a spin-valve magnetoresistive effect (SVMR) element, or with a tunnel magnetoresistive effect (TMR) element.

DESCRIPTION OF THE RELATED ART

Such an MR element has a sensor film operating as a sensor (an MR layer in the AMR element, a ferromagnetic free layer in the GMR element and the TMR element for example), two magnetic domain control films joined or contacted with side end faces of the sensor film, respectively, for applying a longitudinal bias to the sensor film in order to make this sensor film in a single domain state.

The magnetic domain control films are in general made of CoPt or CoCrPt for example. If necessary, a single layer under film of TiW, Cr or CrTi for example is formed under the magnetic domain control films. By using such an under film, it is possible to improve magnetic performance of the magnetic domain control films, such as for example a coercive force Hc and a rectangularity ratio indicating a residual magnetic flux density Br/a saturation magnetic flux density Bs.

However, even if such an under film is used, there is a limit in improvement in the magnetic performance of the magnetic domain control films. This is because the characteristic of the magnetic domain control films depends on the kind of a layer formed under the under film.

Particularly, in junction or joining regions between the sensor film and the magnetic domain control films of the MR element, since the sensor film including for example a NiFe layer and/or a Co layer exists under the under film, the magnetic performance of the magnetic domain control films will be spoiled remarkably. If the magnetic performance of the magnetic domain control films deteriorates, noise such as Barkhausen noise will frequently occur during operations of the magnetic head.

SUMMARY OF THE INVENTION

It is therefore an object of the present invention to provide a thin-film magnetic head with an MR element which will generate little noise and will have an outstanding output stability.

According to the present invention, a thin-film magnetic head with an MR element, includes an MR film, under films each having a multilayer structure with a first under layer and a second under layer laminated on the first under layer, and magnetic domain control films joined to side end faces of the MR film through the under films.

Since each under film of the magnetic domain control films has a multilayer structure including the first and second under layers laminated each other, the magnetic domain control films will not be influenced to deteriorate its magnetic domain control performance from a layer below the under film. As a result, the MR element can provide extremely stable output with suppressing occurrence of Barkhausen noise.

It is preferred that a thickness of the first under layer in joined sections of the MR film with the magnetic domain control films is 5 nm or less.

It is also preferred that the first under layer is made of Ta, Hf, Nb or Zr.

It is also preferred that the second under layer is made of TiW, Cr or CrTi.

Further objects and advantages of the present invention will be apparent from the following description of the preferred embodiments of the invention as illustrated in the accompanying drawings.

DESCRIPTION OF THE PREFERRED EMBODIMENTS

Figure 1:
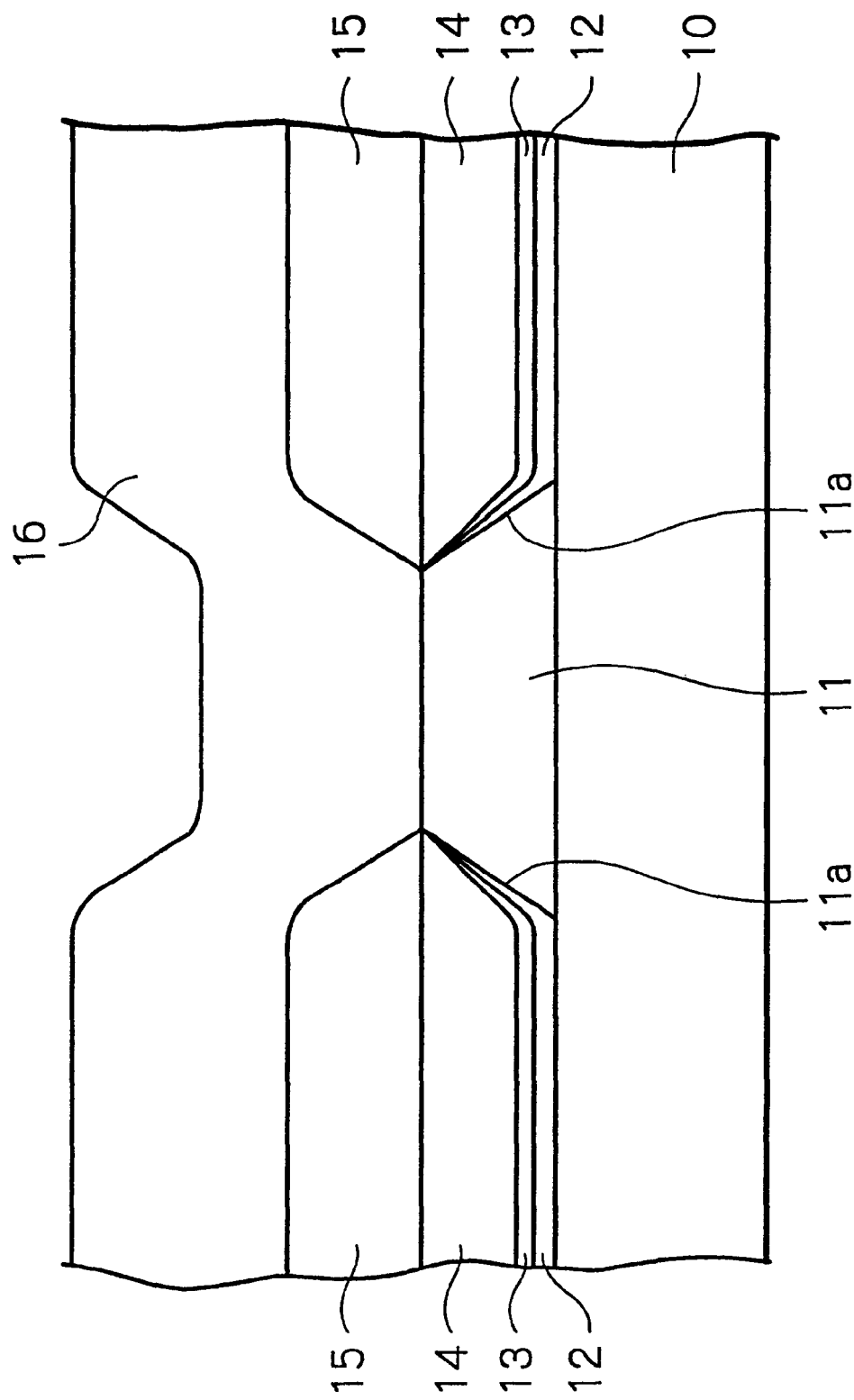
FIG. 1 shows a sectional view, seen from the air bearing surface (ABS), schematically illustrating a structure of an MR element in a preferred embodiment according to the present invention.

FIG. 1 schematically illustrates a structure of an MR element in a preferred embodiment according to the present invention.

In the figure, reference numeral 10 denotes a lower shield gap film formed on a lower shield film (not shown), 11 an MR film formed on the lower shield gap film 10, 12 first under layers formed on the lower shield gap film 10 and on junction sections or joined sections 11a existed at end faces in the longitudinal direction or the track-width direction of the MR film 11, 13 second under layers formed on the respective first under layers 12, 14 magnetic domain control films formed on the respective second under layers 13, 15 lead conductor films formed on the respective magnetic domain control films 14, and 16 an upper shield gap film formed on the MR film 11 and on the lead conductor films 15, respectively.

In case that the thin-film magnetic head is consist of only a read head part provided with an MR element, an upper shield film is formed on the upper shield gap film 16 and a protection film is formed on the upper shield film. In case that the thin-film magnetic head is consist of both a read head part provided with an MR element and a write head part provided with an inductive element, an upper shield film is formed on the upper shield gap film 16 and an inductive write head part is formed on the upper shield film.

The MR film 11 may be an AMR film provided with a single layer structure, or a SVMR or other GMR film provided with a multilayer structure of a ferromagnetic thin-film layer (free layer)/a nonmagnetic thin-film metal layer/a ferromagnetic thin-film layer (pinned layer)/an antiferromagnetic thin-film layer laminated in this order or reversed order.

The magnetic domain control films 14 may be in general made of CoPt, CoCrPt or the like. But material for making the films 14 is not limited to them.

The second under layers 13 may be made of TiW, Cr, CrTi or the like. But material for making the film 13 is not limited to them.

The first under layers 12 may be made of Ta, Hf, Nb or Zr. If there are the first under layers 12 made of such material under the second under layers 13, in other words, if the under film of the magnetic domain control films 14 is formed by such multilayer of the first under layers 12 and the second under layers 13, the magnetic performance of the magnetic domain control films 14 is stabilized but insensitive to the material of a layer existed under the under film. Consequently, a thin-film magnetic head capable of providing stable output with suppressing occurrence of noise, such as Barkhausen noise can be realized.

It is desired that a thickness of each first under layer 12 is 5 nm or less on the joined sections 11a of the MR film 11 with the domain control films 14, and is 10 nm or less in the remaining section. Hereafter, grounds for this is described.

FIGS. 2 to 6 illustrate actually measured results of the magnetic performance of the magnetic domain control films when the thickness of the first under layers 12 made of various materials is changed.

Figure 2:
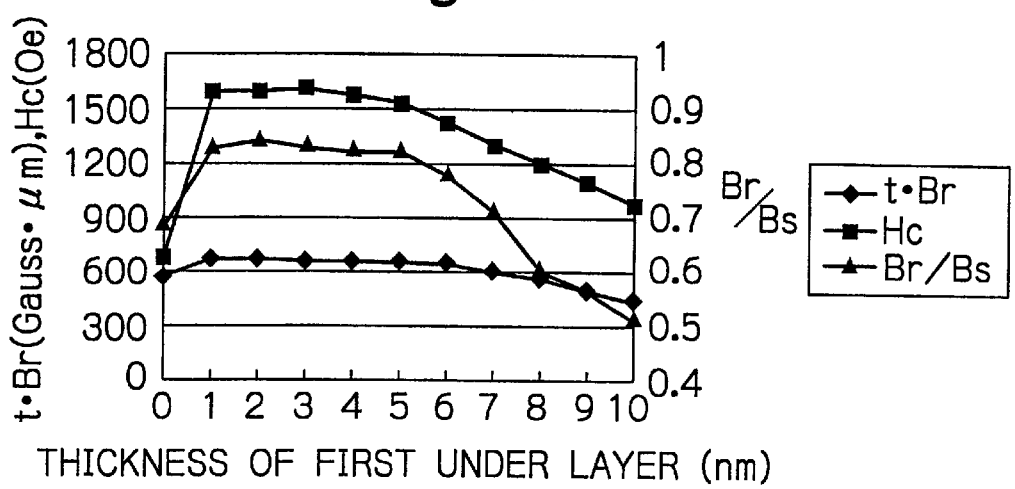
FIG. 2 illustrates a magnetic performance of magnetic domain control films when the thickness of a first under layer made of Ta is changed.

FIG. 2 shows respectively the product t·Br of a thickness t and a residual magnetic flux density Br, a coercive force Hc and a rectangularity ratio Br/Bs indicating a residual magnetic flux density/a saturation magnetic flux density of the magnetic domain control films 14 in case that Ta layers are deposited as the first under layers 12 on a NiFe layer that is one layer included in a free layer of a SVMR film, TiW layers with a thickness of 5 nm are deposited as the second under layers 13 on the Ta layers and CoPt films with a thickness of 60 nm are deposited as the domain control films 14 on the TiW layers.

From this figure, it is understood that Hc and Br/Bs can be kept at good values when the thickness of the Ta layers or the first under layers 12 is 5 nm or less. It is assumed that if the thickness of the Ta layers exceeds 5 nm, the Ta layers itself can have a detrimental effect on the second under layers 13 causing a poor magnetic performance of the magnetic domain control films 14.

The joined sections 11a of the MR film 11 with the domain control films 14 are tapered as shown in FIG. 1. In such case, it is known from experience that when a film is formed on the MR film by deposition, the thickness of the deposited film within the joined sections will become substantially half to that of the deposited film within the other horizontal surface section. Therefore, in order to make the thickness of the first under layers 12 on the joined sections 11a at 5 nm or less, the first under layers 12 should be deposited to have the thickness of 10 nm or less in the other section.

Figure 3:
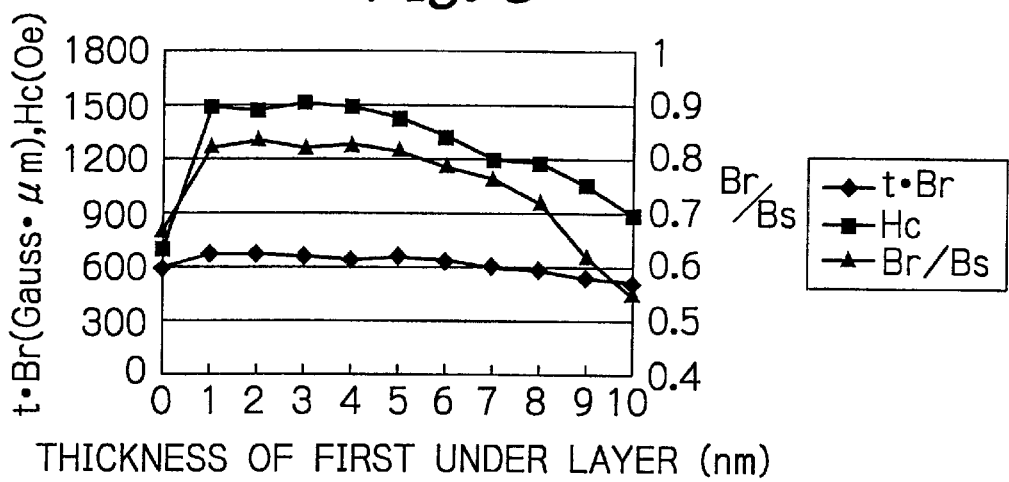
FIG. 3 illustrates a magnetic performance of magnetic domain control films when the thickness of a first under layer made of Ta is changed.

FIG. 3 shows respectively the product t·Br of a thickness t and a residual magnetic flux density Br, a coercive force Hc and a rectangularity ratio Br/Bs indicating a residual magnetic flux density/a saturation magnetic flux density of the magnetic domain control films 14 in case that Ta layers are deposited as the first under layers 12 on a Co layer that is one layer included in a free layer of a SVMR film, TiW layers with a thickness of 5 nm is deposited as the second under layers 13 on the Ta layers and CoPt films with a thickness of 60 nm are deposited as the domain control films 14 on the TiW layers. As well as in the case of FIG. 2, it is understood that Hc and Br/Bs can be kept at good values when the thickness of the Ta layers or the first under layers 12 is 5 nm or less.

Figure 4:
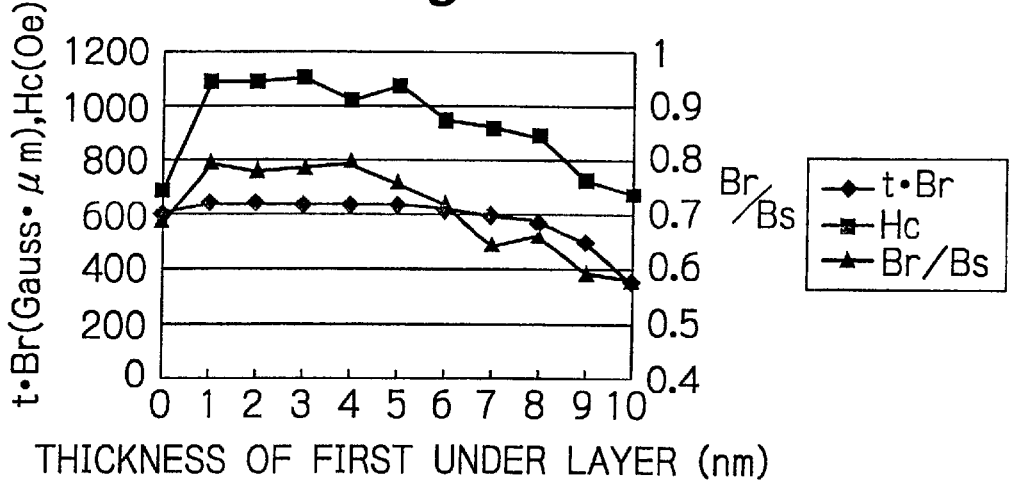
FIG. 4 illustrates a magnetic performance of magnetic domain control films when the thickness of a first under layer made of Hf is changed.

FIG. 4 shows respectively the product t·Br of a thickness t and a residual magnetic flux density Br, a coercive force Ha and a rectangularity ratio Br/Bs indicating a residual magnetic flux density/a saturation magnetic flux density of the magnetic domain control films 14 in case that Hf layers are deposited as the first under layers 12 on a NiFe layer that is one layer included in a free layer of a SVMR film, TiW layers with a thickness of 5 nm are deposited as the second under layers 13 on the Hf layers and CoPt films with a thickness of 60 nm are deposited as the domain control films 14 on the TiW layers. As well as in the case of FIG. 2, it is understood that Hc and Br/Bs can be kept at good values when the thickness of the Hf layers or the first under layers 12 is 5 nm or less.

Figure 5:
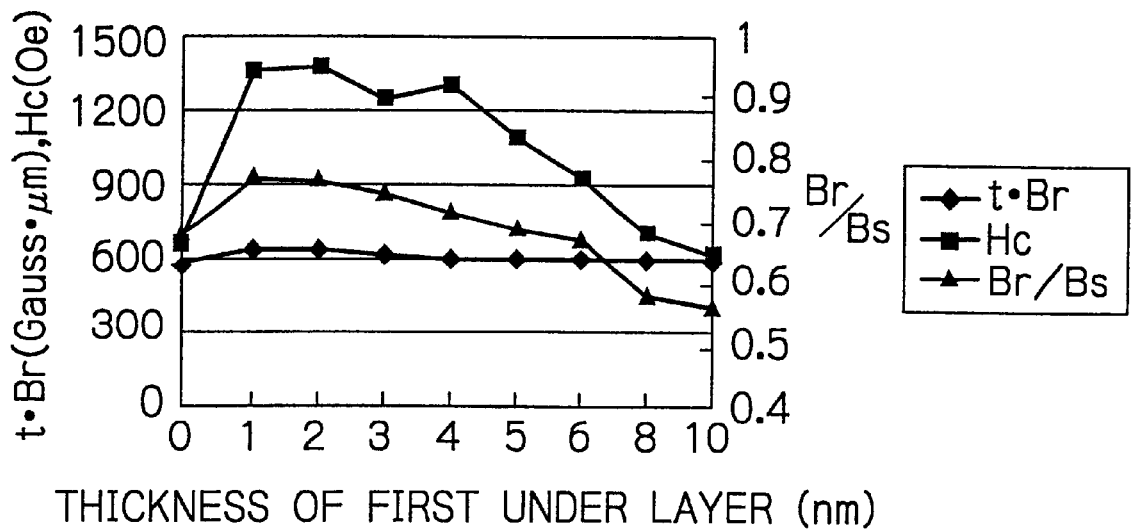
FIG. 5 illustrates a magnetic performance of magnetic domain control films when the thickness of a first under layer made of Nb is changed.

FIG. 5 shows respectively the product t·Br of a thickness t and a residual magnetic flux density Br, a coercive force Hc and a rectangularity ratio Br/Bs indicating a residual magnetic flux density/a saturation magnetic flux density of the magnetic domain control films 14 in case that Nb layers are deposited as the first under layers 12 on a NiFe layer that is one layer included in a free layer of a SVMR film, TiW layers with a thickness of 5 nm are deposited as the second under layers 13 on the Nb layers and CoPt films with a thickness of 60 nm are deposited as the domain control films 14 on the TiW layers. As well as in the case of FIG. 2, it is understood that Hc and Br/Bs can be kept at good values when the thickness of the Nb layers or the first under layers 12 is 5 nm or less.

Figure 6:
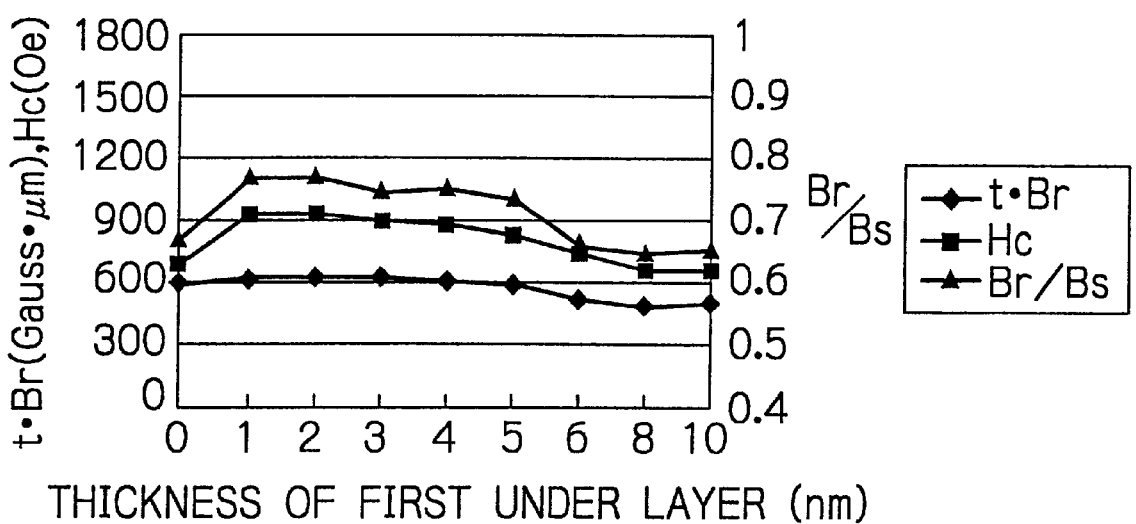
FIG. 6 illustrates a magnetic performance of magnetic domain control films when the thickness of a first under layer made of Zr is changed.

FIG. 6 shows respectively the product t·Br of a thickness t and a residual magnetic flux density Br, a coercive force Hc and a rectangularity ratio Br/Bs indicating a residual magnetic flux density/a saturation magnetic flux density of the magnetic domain control films 14 in case that Zr layers are deposited as the first under layers 12 on a NiFe layer that is one layer included in a free layer of a SVMR film, TiW layers with a thickness of 5 nm are deposited as the second under layer 13 on the Zr layers and CoPt films with a thickness of 60 nm are deposited as the domain control films 14 on the TiW layers. As well as in the case of FIG. 2, it is understood that Hc and Br/Bs can be kept at good values when the thickness of the Zr layers or the first under layers 12 is 5 nm or less.

The aforementioned embodiment concerns to an AMR element or a GMR element in which the sense current flows along the layer plane direction. However, the present invention can be applied to a GMR element in which the sense current flows along a direction perpendicular to the layer plane or to a TMR element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head with a magnetoresistive effect element, comprising:

a magnetoresistive effect film;

under films each having a multilayer structure with a first under layer and a second under layer laminated on said first under layer; and magnetic domain control films joined to side end faces of said magnetoresistive effect film through said under films.

2. The thin-film magnetic head as claimed in claim 1, wherein a thickness of said first under layer in joined sections of said magnetoresistive effect film with said magnetic domain control films is 5 nm or less.

3. The thin-film magnetic head as claimed in claim 1, wherein said first under layer is made of Ta, Hf, Nb or Zr.

4. The thin-film magnetic head as claimed in claim 1, wherein said second under layer is made of TiW, Cr or CrTi.

5. The thin-film magnetic head as claimed in claim 1, further comprising a shield gap film, the magnetoresistive effect film being formed on said shield gap film and the first under layer being formed at least on said shield gap film.

6. The thin-film magnetic head as claimed in claim 5, wherein a thickness of said first under layer formed on said shield gap film is 10 mm or less.

7. The thin-film magnetic head as claimed in claim 2, wherein a thickness of said first under layer formed on a shield gap film is 10 mm or less.

8. The thin film magnetic head as claimed in claim 1, wherein top surfaces of said magnetic domain control films and a top surface of said magnetoresistive effect film as co-planar.

* * * * *